United States Patent
Cazorla Almeida

(10) Patent No.: US 8,555,284 B2
(45) Date of Patent: Oct. 8, 2013

(54) METHOD, A MECHANISM AND A COMPUTER PROGRAM PRODUCT FOR EXECUTING SEVERAL TASKS IN A MULTITHREADED PROCESSOR

(75) Inventor: Francisco Javier Cazorla Almeida, San Fernando de Maspalomas (ES)

(73) Assignee: Barcelona Supercomputing Center-Centro Nacional De Supercomputacion, Barcelona (ES)

( * ) Notice: Subject to any disclaimer, the term of this patent is extended or adjusted under 35 U.S.C. 154(b) by 758 days.

(21) Appl. No.: 12/625,400

(22) Filed: Nov. 24, 2009

(65) Prior Publication Data

US 2010/0131958 A1    May 27, 2010

Related U.S. Application Data

(60) Provisional application No. 61/117,355, filed on Nov. 24, 2008.

(30) Foreign Application Priority Data

Nov. 24, 2008    (EP) .................................... 08169785

(51) Int. Cl.
G06F 9/46    (2006.01)
G06F 9/50    (2006.01)
G06F 13/00    (2006.01)

(52) U.S. Cl.
USPC .......................................... 718/102; 718/104

(58) Field of Classification Search
None
See application file for complete search history.

(56) References Cited

U.S. PATENT DOCUMENTS 4,641,266 A * 2/1987 Walsh ........................... 710/111
2005/0210471 A1 * 9/2005 Okawara ....................... 718/100

OTHER PUBLICATIONS

Rizzo L., "Dummynet: a simple approach to the evaluation of network protocols", Jan. 1997, Computer Communication Review ACM USA, vol. 27, No. 1, pp. 31-44.*
White P P et al., "Optimised Batch Patching with Classes of Service", Oct. 2000, Computer Communication Review ACM. vol. 30., No. 5, pp. 21-28.*

(Continued)

Primary Examiner — Qing Wu
(74) Attorney, Agent, or Firm — Peter B. Scull; Hamilton, Desanctis & Cha LLP

(57) ABSTRACT

A method for executing several tasks in a multithreaded (MT) processor, each task having, for every hardware shared resource from a predetermined set of hardware shared resources in the MT processor, one associated artificial time delay that is introduced when a task accesses a hardware shared resource, the method including step (a) of establishing, for every hardware shared resource and each task to be artificially delayed, the artificial delay to be applied to each access of each task to every hardware shared resource; step (b) of performing the following steps (b1) to (b4) on the access of each task to be artificially delayed to every hardware shared resource in the predetermined set of hardware shared resources in the MT processor: step (b1) of verifying if a request is ready to be sent to the hardware shared resource; in case of positive result, Step (b2) of verifying if the hardware shared resource is ready to accept the request; in case of positive result, step (b3) of delaying the request by the artificial delay established for the hardware shared resource; step (b4) of allowing the request of the task to access the hardware shared resource.

14 Claims, 6 Drawing Sheets

(56) References Cited

OTHER PUBLICATIONS

A. El-Haj-Mahmoud, A. S. Al-Zawawi, A. Anantaraman, and E. Rotenberg; Virtual Multiprocessor: An Analyzable, High-Performance Microarchitecture for Real-Time Computing; Proceedings of the 2005 International Conference on Compilers, Architecture, and Synthesis for Embedded Systems (CASES'05); pp. 213-224; Sep. 2005.

Thomas Lundqvist and Per Stenstrom; Timing Anomalies in Dynamically Scheduled Microprocessors; Proceedings of the 20th IEEE Real-Time Systems Symposium (RTSS); pp. 12-21; Dec. 1999.

Jan Reineke, Bjorn Wachter, Stephan Thesing, Reinhard Wilhelm, Ilia Polian, Jochen Eisinger, Bernd Becker; A Definition and Classification of Timing Anomalies; 7th International Workshop on Worst-Case Execution Time (WCET) Analysis; Jul. 2006.

Alexandru Andrei, Petru Eles, Zebo Peng, Jacob Rosen; Predictable Implementation of Real-Time Applications on Multiprocessor Systems-on-Chip; Proceedings of the 21st International Conference on VLSI Design; IEEE Computer Society; pp. 103-110; 2008.

\* cited by examiner

FIG.1
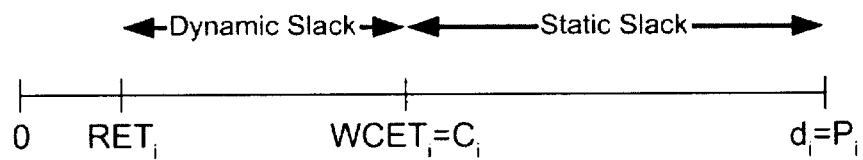
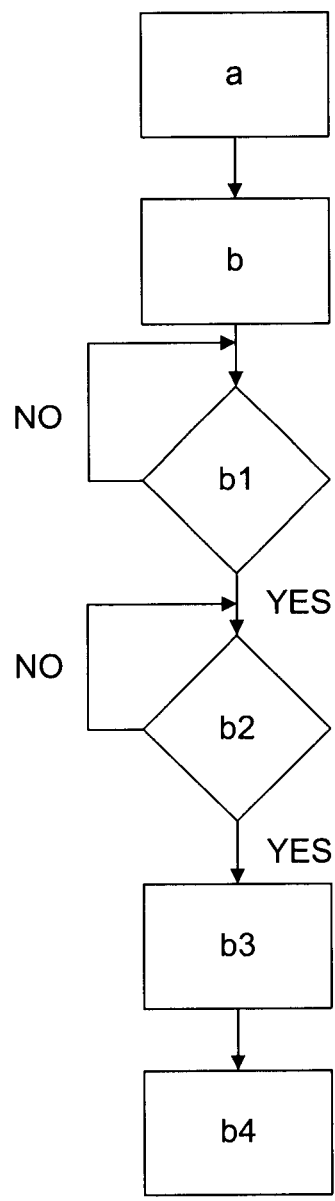
FIG.3

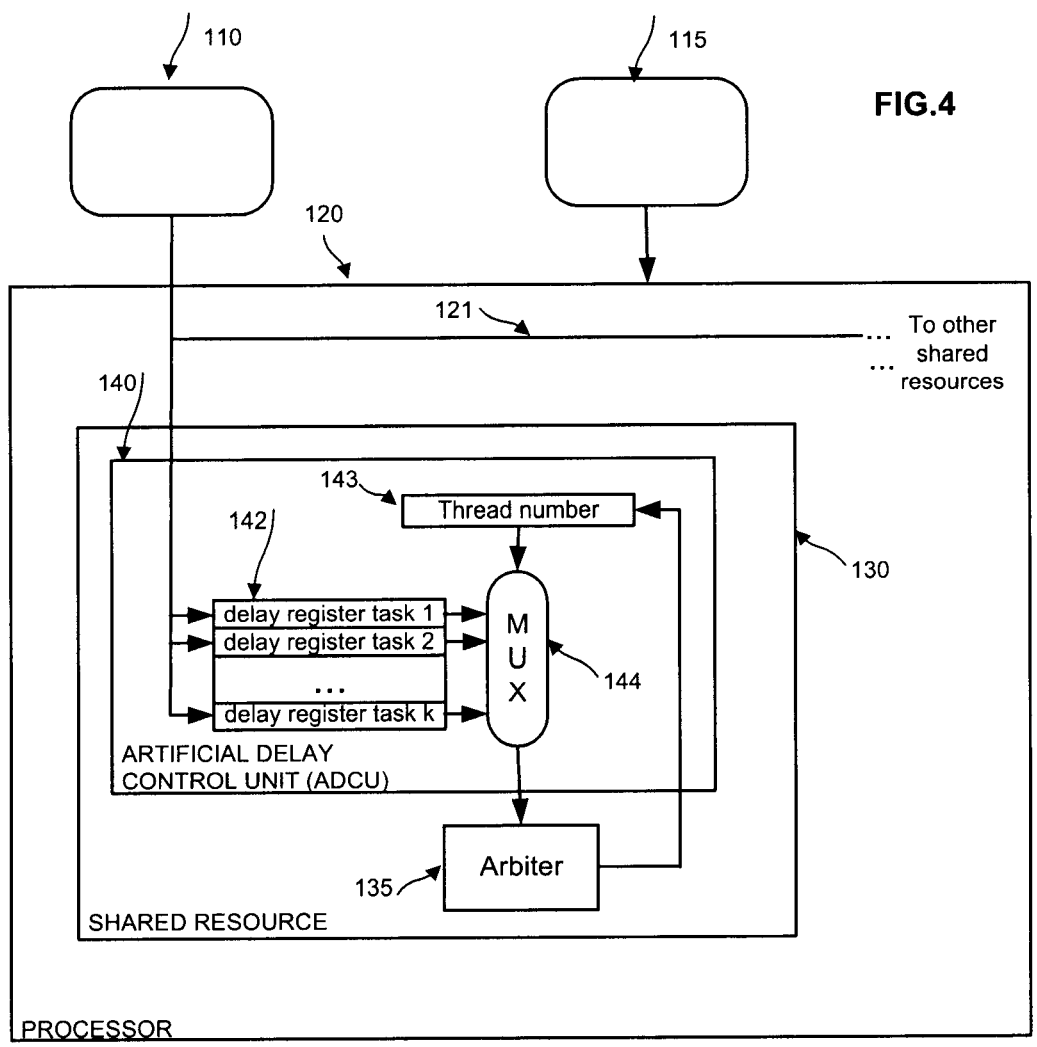

FIG.7

|      | n-1 | n+0 | n+1 | n+2 | n+3 | n+4 | n+5 | n+6 | n+7 |
|------|-----|-----|-----|-----|-----|-----|-----|-----|-----|
| task |     | A   | B   | B   | S   | S   | S   | S   | S   |

|      | n-1 | n   | n+1 | n+2 | n+3 | n+4 | n+5 | n+6 | n+7 |
|------|-----|-----|-----|-----|-----|-----|-----|-----|-----|
| NHRT | A   | B   | B   | S   | S   | S   | S   | S   |     |
| HRT1 |     | -   | -   | -   | -   | A   | B   | B   | S   |
| HRT2 |     |     |     |     |     | -   | -   | -   | -   |

|      | n+8 | n+9 | n+10 | n+11 | n+12 | n+13 | n+14 | n+15 | n+16 |
|------|-----|-----|------|------|------|------|------|------|------|
| NHRT |     |     |      |      |      |      |      |      |      |
| HRT1 | S   | S   | S    | S    |      |      |      |      |      |
| HRT2 | -   | A   | B    | B    | S    | S    | S    | S    | S    |

FIG.8

METHOD, A MECHANISM AND A COMPUTER PROGRAM PRODUCT FOR EXECUTING SEVERAL TASKS IN A MULTITHREADED PROCESSOR

The present application claims priority to U.S. patent application Ser. No. 61/117,355, filed on Nov. 24, 2008, which was entitled "A method, a mechanism and a computer program product for executing several tasks in a multi-threaded processor", and to Spanish patent application no. EP 08169785.6, which was filed on Nov. 24, 2008, the disclosures of which are herein incorporated by reference.

The present invention relates to a method for executing several tasks in a multithreaded (MT) processor, each task having, for every hardware shared resource of a predetermined set of hardware shared resources in the MT processor, one associated value of time corresponding to an artificial delay introduced when said task accesses said hardware share resource. More specifically, the invention relates to a method to artificially delay the accesses of threads running in a multithreaded processor to the hardware shared resources of said multithreaded processor, the artificial delay to introduce in each access to the hardware shared resources being configured by the user.

The invention also relates to a mechanism for executing several tasks in a MT processor suitable for carrying out such a method.

The mechanism of the invention allows determining the sensitivity of a given task to inter-task conflicts when task run in a multithreaded processor together with other tasks. The mechanism also enables executing simultaneously several Hard Real-Time task together with zero or more Non Hard-Real Time tasks on the same MT processor, in such a way that it can be provided a safe WCET estimation of the execution time of the HRT tasks when run in the MT processor.

Preferably, the invention is applied in embedded real-time systems.

DEFINITIONS

Certain terms throughout the following description refer to particular system components. As one skilled in the art will appreciate, microprocessor companies may refer to a component by different names. This document does not intend to distinguish between components that differ in name but in function.

The term "couple" or "couples" or "connect" is intended to mean either an indirect or direct electrical connection. Thus, if a first device couples to a second device, that connection may be through a direct electrical connection, or through an indirect electrical connection via other devices and connections.

The term "multithreaded processor" is intended to mean any type of processors that allows to execute more than one thread at the same type and has some hardware resources shared between those threads. Examples of multithreaded processors are: simultaneous multithreading processors, fine grain multithreading processors, coarse grain multithreaded processors, multicore processors, or any combinations of them.

The term "Hard Real-Time task" or "HRT task" refer to those tasks that require absolute time-predictability such that an execution deadline should never be missed. In contrast the term "Non-Hard Real-Time task" or "NHRT task" refer to the tasks with soft real-time constraints or soft-real time tasks (SRT tasks), which are more relaxed in the sense that deadlines could occasionally be missed; or tasks without time constrains (Non Real-Time or NRT tasks).

The term "resource" by default refers to a hardware resource.

The term "inter-task interaction" or "inter-task conflict" refers to the interaction/conflict a thread suffers in the resources because the execution of other tasks. That is, it is possible to say that a task suffers an inter-task interaction/conflict in a shared resource when said task is going to use a resource and it is used by any other task.

BACKGROUND ART

Historically, processors for embedded hard real-time markets typically have been characterized by a simple architecture, with short pipelines and in-order execution in order to ease the computation of the worst-case execution time (WCET). However, a significant percentage of real-time application systems require or may improve their functionality, if the processors could provide higher performance than these simple architectures. These tasks range from soft-real time applications like video-coding and decoding applications, to hard-real time applications like automotive, avionic applications and industrial control systems.

Multithreaded processors can provide this additional performance required by real-time systems. Multithreaded (MT) processors allow the execution of several tasks at the same time, which leads to both, higher performance and a reduced number of processors required in a given system. Moreover, resource sharing in these processors allows them to have good "performance/cost" and "performance/power consumption" ratios. This characteristic makes MT processors a good option for embedded real-time systems.

However, at the same time, resource sharing causes the execution of tasks to become highly variable, as tasks interact in an unknown way with the other hard real-time (HRT) and non-hard real-time (NHRT) tasks. This makes MT processors unsuitable for embedded real-time systems. That is, there is a major drawback that impedes the use of MT processors in embedded real-time systems: the execution time of tasks on a MT processor becomes highly unpredictable as tasks share resource dynamically at execution time in an unpredictable way. Under these circumstances, the real-time constraints of embedded systems cannot be ensured.

At a hardware level, the unpredictability introduced by sharing resources has been avoided by providing full isolation in the execution of hard-real time tasks. That is, the hardware allows the execution of a HRT task and NHRT tasks by providing an interaction-free execution of the HRT task. In this category we find the documents [A. El-Haj-Mahmoud, A. S. AL-Zawawi, A. Anantaraman, and E. Rotenberg. *Virtual Multiprocessor: An Analyzable, High-Performance Microarchitecture for Real-Time Computing. Proceedings of the 2005 International Conference on Compilers, Architecture, and Synthesis for Embedded Systems (CASES '05)*, pp. 213-224, September 2005] and [*Infineon Technologies AG. TricoreTM2 Architecture Manual*]. In the former document, authors propose an architecture that provides an interference-free execution between threads in a MT architecture that allows the execution of HRT threads. This proposal requires the architecture of the processor to be changed so that no interaction between threads is allowed. In the latter, the execution of a background NHRT task is allowed only when the foreground HRT task experiences an instruction cache miss. The NHRT task can never delay the HRT task.

In order to achieve full isolation, the proposed architecture impedes any interference between threads. This requires significant changes at the architecture level: all buffers are duplicated for each thread, functional units are assumed totally pipelined so each one can process one new operation per cycle, normal caches are not allowed, etc.

In a European patent application (from the same applicant of the present application) with title "A multithreaded processor and a mechanism and a method for executing one hard real-time task in a multithreaded processor" it is proposed a method and a mechanism to execute a single HRT task together with several NRT tasks and SRT tasks. In the proposed solution the software provides the hardware with the slack time of the HRT task. Every time the HRT task may be delayed by a NHRT task the hardware extract this delay from the remaining slack time. If the remaining slack time reaches a minimum value the NHRT tasks are stopped preventing the HRT task to miss its deadline.

As described above, the main source of unpredictability in a MT processor is inter-task conflicts. It is possible to say that a task suffers an inter-task conflict in a shared resource when said task is going to use a resource and it is used by any other task. In single-thread architectures, in which only one thread is running at a time, threads almost do not suffer inter-task interferences. Only when a task is scheduled out of the processor and eventually it is re-scheduled back, it can suffer inter-task conflicts, for example in the cache, as the task(s) running while it was scheduled out evicted part of its data. However, given that tasks do not run at the same time, the number of inter-task conflicts is low.

In a multithreaded processor, however, threads suffer many more inter-thread conflicts as they share at the same time processor resources. The effect that inter-task effect has on a given task depends of several factors: the number of shared resources running in the architecture, how many threads share said resources at the same time, and the type of resource.

Once we fix a given multithreaded architecture, the effect of the inter-task conflicts depends mainly on the other tasks a given task is co-scheduled with. A common methodology to analyze the sensitivity of such task to inter-task conflicts consists of running such task in a set of different 'stressing' workloads. These workloads are composed by tasks that stress the different shared resources, so that the task under study is affected.

This method presents several disadvantages. Firstly, the threads in the stressing workloads have to be carefully designed so they properly stress a given resources. On the other hand, it is hard to obtain a minimum level of stress on all shared resources at the same time. Finally, for every new generation of multithreaded processor in which the shared resources change, a redesign of the stressing workloads is required.

SUMMARY OF THE INVENTION

It is an object of the present invention to provide a mechanism for executing several tasks in a multithreaded processor that simplifies the analysis of the behaviour of said tasks when they suffer inter-task conflicts.

To achieve the above, according to a first aspect, the invention provides a mechanism for executing several tasks in a multithreaded (MT) processor, each task having, for every hardware shared resource from a predetermined set of hardware shared resources in the MT processor, one associated artificial time delay that is introduced when said task accesses said hardware shared resource, the mechanism comprising means for establishing, for every hardware shared resource in the predetermined set of hardware shared resources and each task to be artificially delayed, the artificial delay to be introduced to each access of said task to said hardware shared resource; means for verifying if a request is ready to be sent to said hardware shared resource; means for verifying if the shared resource is ready to accept said request; means for delaying said request by the artificial delay established for said hardware shared resource; means for allowing the request of the task to access said hardware shared resource.

The mechanism of the invention allows determining the sensitivity of a given task to the inter-task conflicts when run in a multithreaded processor. It is possible to analyze the sensitivity of each task to inter-task in isolation and without significant changes if some shared resource changes are added from one processor generation to the followings.

In this way, the mechanism artificially delays the accesses of threads running in a multithreaded processor to the hardware shared resources of said multithreaded processor. The artificial delay to introduce in each access to the shared resources is configured by the user.

Basically, the architecture of the multithreaded processor provides means for running a given workload, workload$_{To\text{-}Study}$, with at least one task in said multithreaded processor in such a way that when that task, task$_j$, sends a request to use a shared resource, $r_i$, and the resource is ready to be used, the architecture makes the request of task$_j$ to wait for Artificial-Delay$^{ri}$ $_{taskj}$ processor cycles before it is granted access to said shared resource. The multithreaded processor also provides means for allowing the software to configure the delay to add to every access of running tasks to shared resources.

According to a second aspect, the invention provides a method for executing several tasks in a multithreaded (MT) processor, each task having, for every hardware shared resource from a predetermined set of hardware shared resources in the MT processor, one associated artificial time delay that is introduced when said task accesses said hardware shared resource, the method comprising the steps of:

a. Establishing, for every hardware shared resource and each task to be artificially delayed, the artificial delay to be applied to each access of said task to said hardware shared resource;

b. Performing the following steps (b1) to (b4) on the access of each task to be artificially delayed to every hardware shared resource in the predetermined set of hardware shared resources in the MT processor:

b1. Verifying if a request is ready to be sent to said hardware shared resource;
In case of positive result,
b2. Verifying if the hardware shared resource is ready to accept said request;
In case of positive result,
b3. Delaying said request by the artificial delay established for said hardware shared resource;
b4. Allowing the request of the task to access said hardware shared resource.

According to an embodiment of the invention, the method may comprise a step (c) of storing the established artificial delay in step (a); and a step (d) of obtaining, before step (b3), the stored artificial delay. Said artificial delays may be stored in a table (DelayTab) for each shared resource. This table may be implemented, for example, with a set of registers. The DelayTab table has as many entries as the maximum number of tasks that can be delayed. In each entry, it is saved the artificial delay to introduce when said task accesses said hardware shared resource.

Further, the invention provides a multithreaded (MT) processor that comprises a mechanism for executing several tasks as described above.

According to yet another aspect, the invention provides a computer program comprising program instructions for causing a computer to perform the method for executing several tasks in a multithreaded (MT) processor. Said computer program may be embodied on storing means (for example, on a record medium, on a computer memory or on a read-only memory) or carried on a carrier signal (for example, on an electrical or optical carrier signal).

On the other hand, the invention also provides a mechanism for executing several hard real-time (HRT) tasks simultaneously in a multithreaded (MT) in such a way that it is possible to compute a safe WCET estimation for the HRT tasks. Such mechanism for executing several HRT tasks simultaneously in a multithreaded (MT) processor comprises means for establishing a set of parameters relating to the configuration of the MT processor; means for determining, according to the established set of parameters, the maximum delay, for every resource of a predetermined set of resources shared by at least two of the HRT tasks in the MT processor, that each of said HRT tasks can suffer when accessing said shared resource; the mechanism for executing several tasks in a MT processor for executing each HRT task in isolation, wherein the established artificial delay for the task is the maximum delay and each HRT task is delayed when accessing every shared resource according to said artificial delay; means for computing the Worst Case Execution Time (WCET) for each HRT task, which takes into account the MT processor configuration set of parameters; means for verifying if the computed WCET for each HRT task fits a given suitable scheduling of the HRT tasks; Means for configuring the MT processor in a mode in which no artificial delay is introduced to the HRT tasks when said tasks access shared resources; means for executing the HRT tasks according to said mode.

According to an embodiment of the invention, the mechanism for executing several hard real-time (HRT) tasks simultaneously in a MT processor also simultaneously executes at least one NHRT task, wherein, the predetermined set of resources are shared by at least two tasks from any of the HRT tasks and the NHRT task, wherein, none of the HRT tasks or the NHRT task is artificially delayed when accessing a shared resource, and wherein means for executing the HRT tasks executes the HRT tasks and the NHRT task.

Basically, said mechanism allows computing a safe upper-bound WCET for the several HRT tasks when they run together with zero or more NHRT tasks in a multithreaded processor with hardware resources shared between tasks and configured under a setup s (i.e. the set of parameters relating to the configuration of the MT processor). The mechanism comprises means for upper-binding the maximum delay, $Maxdelay^{ri}_s$, that every HRT task can suffer due to the other interaction with the other HRT and NHRT tasks when accessing the shared resource, $r_i$; means for executing each HRT in isolation in the multithreaded processor using the mechanism that allows determining the sensitivity of a given task to the inter-task conflicts when run in a multithreaded processor, establishing the HRT as the $workload_{ToStudy}$, the $Maxdelay^{ri}_s$ computed for the current HRT as the $ArtificialDelay^{ri}_{taskj}$; and means for providing information of the execution of each HRT task to an external WCET estimation tool. The resulting estimated WCET is ensured to be higher than the execution time of said HRT when run with simultaneously with other NHRT tasks in said multithreaded processor under the same processor setup s. Consequently, the mechanism is able to run mixed-application (HRT, SRT and NRT tasks) workloads so that the number of processors required is low, reducing cost and energy consumption.

With the described mechanisms, the WCET of each HRT task can be computed assuming that the time to access each shared resource, $r_i$, is $AccessTime^{ri}$ plus $Maxdelay^{ri}_s$, where $AccessTime^{ri}$ is the maximum actual time to access time to that resource, if there is no inter-task resource conflict, and $Maxdelay^{ri}_s$ is the maximum delay that said HRT may suffer due to the interaction with other HRT and NHRT tasks. In, each setup s, the processor can have, for example, a different arbitration policy among the tasks when accessing a shared resource. Depending on the policy the value of the maximum time a HRT task has to wait to get access to a shared resource, $Maxdelay^{ri}_s$, may change.

$Maxdelay^{ri}_s$ must be set so that it also accounts for the longest time any HRT is delayed to get access to the resource $r_i$, under the configuration s of the processor, due to the interaction with other HRT and NHRT tasks. $Maxdelay^{ri}_s$ may vary depending on the setup, s, in which the processor is configured, e.g. in a given mode s1 the processor provides an round robin access policy to shared resources among running tasks, while in a mode s2 the processor provide a First In First Out access policy.

By adding a delay $Maxdelay^{ri}_s$ when accessing a resource, it is possible to ensure that when computing the WCET it is taken into account the worst situation that the HRT task can address when run with other threads. This is due to the fact, that by construction the architecture is going to grant access, to the shared resource $r_i$, to any HRT in less than $Maxdelay^{ri}_s$ cycles after said HRT task request access to the shared resource.

Once the WCET of each HRT tasks have been computed and an appropriate scheduling has been computed, all tasks can be safely executed in the processor. When the HRT tasks and the NHRT tasks are run simultaneously, that is the processor runs deactivating the first method that allows determining the sensitivity of a given task to the inter-task conflicts when run in a multithreaded processor, so that the processor does not introduce any artificial delay when tasks access shared resources.

In order to achieve the described object, the mechanism does not require either changing the way the WCET is computed, changing the real-time operating system or the applications themselves, or significant hardware changes (the WCET analysis tool only has to introduce a given delay, $Maxdelay^{ri}_s$, when accessing each shared resource). Regarding the WCET tool, the only observed changed is to consider that the access of each resource is $AccessTime^{ri}$ plus $Maxdelay^{ri}_s$ instead of just $AccessTime^{ri}$.

The invention also provides a method for executing several hard real-time (HRT) tasks simultaneously in a multithreaded (MT) processor comprising the steps of:

e. Establishing a set of parameters relating to the configuration of the MT processor;

f. Determining, according to the established set of parameters, the maximum delay, for every resource of a predetermined set of resources shared by at least two of the HRT tasks in the MT processor, that each of said HRT tasks can suffer when accessing said shared resource;

g. Executing each HRT task in isolation according to the method for executing several tasks in a MT processor according to any of claims 1 or 2, wherein the established artificial delay for the task is the maximum delay determined in step (f) and each HRT task is delayed when accessing every shared resource according to said artificial delay;

h. Computing the Worst Case Execution Time (WCET) for each HRT task according to the execution of said HRT task in step (g), which takes into account the MT processor configuration set of parameters;

i. Verifying if the computed WCET for each HRT task fits a given suitable scheduling of the HRT tasks;

In case of positive result, j. Configuring the MT processor in a mode in which no artificial delay is introduced to the HRT tasks when said tasks access shared resources;

k. Executing the HRT tasks according to said mode.

Said method includes determining the available slack for the HRT task, and computing a feasible scheduling for the tasks. The method also includes initializing both processor setup and the DelayTab table in the different hardware shared resources of the processor with the maximum delay determined in step (f).

In each setup of said multithreaded processor, the processor can have, for example, a different arbitration policy among the tasks when accessing a hardware resource, which leads to a different Maxdelay$^{ri}_s$. Further the processor comprises the table DelayTab which have as many entries as the maximum number of tasks that can be delayed. Each entry, saves a delay given by the software to introduce to the access of each task, task$_j$, to that hardware resource Artificial Delay$^s_{taskj}$.

According to an embodiment of the invention, MT processor configuration set of parameters comprises at least one of the following parameters: the number of HRT tasks to be executed, the number of NHRT tasks to be executed, and the arbitration policy that grants access to each shared resource.

According to another embodiment of the invention, in case of negative result in step (i), the control of the method goes to step (e).

In another embodiment, in step (i), the computed WCET for each HRT task fits the given suitable scheduling of the HRT tasks when the WCET of each HRT task is lower than the deadline of said HRT task.

Furthermore, the invention provides a multithreaded (MT) processor that comprises a mechanism for executing HRT tasks simultaneously as described above. In each setup of said multithreaded processor, the processor can have, for example, a different arbitration policy among the tasks when accessing a resource, which leads to a different Maxdelay$^{ri}_s$. Further the processor may comprise the described table DelayTab.

Finally, the invention also provides a computer program comprising program instructions for causing a computer to perform the method for executing several tasks in a multithreaded (MT) processor. Said computer program may be embodied on storing means (for example, on a record medium, on a computer memory or on a read-only memory) or carried on a carrier signal (for example, on an electrical or optical carrier signal).

Further, the invention provides a method for executing several hard real-time (HRT) tasks and at least one non-hard real-time (NHRT) task simultaneously in a multithreaded (MT) processor comprising the steps of:

e. Establishing a set of parameters relating to the configuration of the MT processor;

f. Determining, according to the established set of parameters, the maximum delay, for every resource of a predetermined set of resources shared by at least two tasks from any of the HRT tasks and the NHRT task in the MT processor, that each of said HRT tasks can suffer when accessing said shared resource;

g. Executing each HRT task in isolation according to the method for executing several tasks in a MT processor according to any of claims 1 or 2, wherein the established artificial delay for the task is the maximum delay determined in step (f) and each HRT task is delayed when accessing every shared resource according to said artificial delay;

h. Computing the Worst Case Execution Time (WCET) for each HRT task according to the execution of said HRT task in step (g), which takes into account the MT processor configuration set of parameters;

i. Verifying if the computed WCET for each HRT task fits a given suitable scheduling of the HRT tasks;

In case of positive result, j. Configuring the MT processor in a mode in which no artificial delay is introduced to the HRT tasks and the NHRT task when said tasks access shared resources;

k. Executing the HRT tasks according to said mode.

BRIEF DESCRIPTION OF THE DRAWINGS

An embodiment of the present invention will be described in the following, only by way of non-limiting example, with reference to the appended drawing, in which:

FIG. 1 is a schematic representation of the common parameters used when scheduling real-time tasks;

FIG. 3 is a flow chart illustrating the method for executing several tasks in a MT processor that introduces an artificial delay when certain specified tasks access certain specified resources, said method being used by the method of FIG. 2;

FIG. 4 is a schematic representation of the mechanism for executing several tasks in a MT processor that introduces an artificial delay when certain specified tasks access certain specified resources, according to the invention;

FIG. 7 illustrates the timing of an access in the architecture shown in FIG. 5 when said access suffers no resource conflict; and FIG. 8 illustrates the timing of an access in the architecture shown in FIG. 5 when said access suffers a resource conflict.

DESCRIPTION OF EMBODIMENTS

Figure 2:
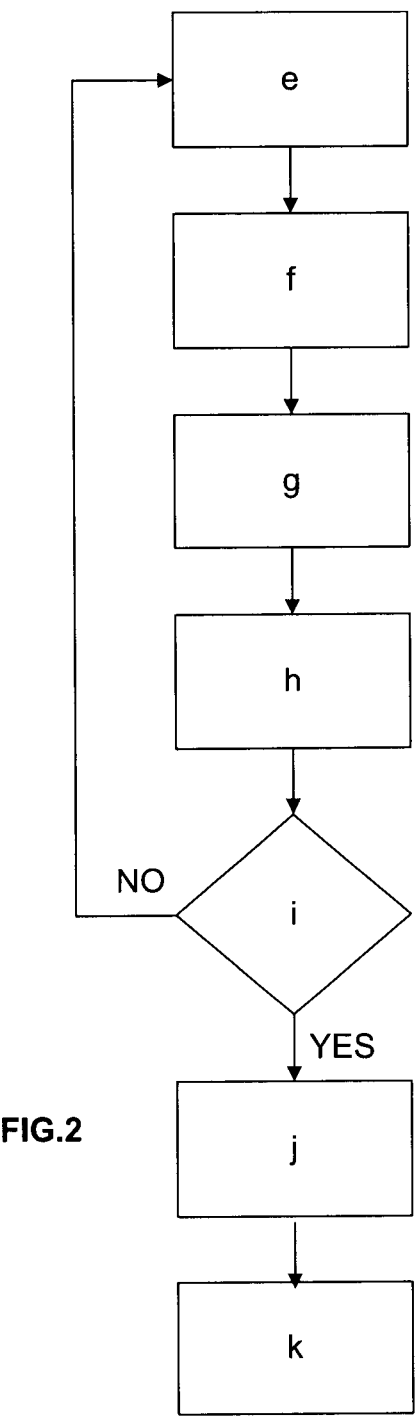
FIG. 2 is a flow chart illustrating the method for executing several HRT tasks together with zero or more NHRT tasks simultaneously in a multithreaded (MT) processor, so that it is possible to compute a safe WCET estimation for the HRT tasks.

In the following detailed description, a multithreaded (MT) processor comprising a mechanism for executing several tasks and a mechanism for executing HRT tasks simultaneously according to the invention will be described. In this preferred embodiment, the processor is configured according to a setup s.

A real-time task, i, is usually characterised by the parameters shown in FIG. 1:

Deadline ($d_i$): it is the time before which the task has to be executed;

Worst Case Execution Time (WCET$_i$=$C_i$): it is an upper bound of the execution time of the task, and it follows the relation WCET$_i \leq d_i$;

Real Execution Time (RET$_i^j$), for each instance, j, of the task: it is the time that instance of the task takes to be executed, and it follows the following relation $RET_i^j \leq WCET_i$. $RET_i$ is the average execution time of the different instances of the task, $$RET_i = \frac{1}{N} \cdot \sum_{j=1}^{N} RET_i^j$$

If the task is periodic, another parameter that is given is the period Pi, which determines the time until the next instance to the task arrives to the system. For sake of simplicity, normally in periodic systems, the deadline of each task is set equal to its period, which means that a task have to be executed before the next instance of the task arrives to the system.

The static slack corresponds to the difference between the WCET of a task and its Period P, StaticSlack=P−WCET. It is called static because it is known before the run of the application.

The dynamic slack corresponds to the difference between the average execution time of a task RET and its WCET, DynamicSlack=WCET−RET.

In general, when the WCET for a given HRT task is computed, it is assumed that the task has full access to all resources of the processor. However, this is not the case for MT architectures since at run time the HRT task is going to share it resources with other threads. Note that in MT environments the job scheduler should know how the workload can affect the WCET. Redefining WCET as the longest execution time in an arbitrary workload is not an option. By carefully selecting a workload, the WCET for a given HRT task could be made arbitrarily large. Moreover, analytical approaches to WCET would fail miserably if they would need to take another thread into consideration.

If the processor architecture provides full isolation in the execution of the HRT task, then the NHRT tasks would only access those resources not used by the HRT thread and the HRT task would not be delayed by the NHRT tasks. However, in a standard multithreaded architecture, resources are shared between running threads so threads interact each other. Providing full isolation will require changes in the hardware so that any interaction between the HRT tasks is avoided. In order to achieve this goal significant changes are proposed to the architecture: all buffers are duplicated for each thread, functional units are assumed totally pipelined so each one can process one new operation per cycle, normal caches are not allowed, etc. Moreover, resource sharing is the key element of the multithreaded architectures to provide high performance and good performance/cost and performance/power consumption ratios.

In contrast to the disclosed state of the art, the present invention allows providing a safe WCET for tasks when they run in a multithreaded processor with shared resources. The mechanism according to the invention provides an upper bound of the time a task can be delay when accessing a given shared resource, $MaxDelay^{r_i}_s$. This upper bound depends on the number of HRT and NHRT tasks running on the processor configuration. Once a processor setup is selected, the mechanism according to the invention can be configured to introduce said $MaxDelay^{r_i}_s$ delay in all the accesses of a task to said shared resource, $r_i$. When computing the WCET with a given tool, the mechanism according to the invention adds a delay of $MaxDelay^{r_i}_s$ to every access to each shared resource during the computation of the WCET, making the WCET provided for the tasks a safe upper bound of the execution time of the tasks when running simultaneously in a multithreaded architecture with shared resources.

The object of the present embodiment is that the processor executes several HRT tasks together with zero or more NHRT tasks simultaneously in a multithreaded (MT) processor, so that it is possible to compute a safe WCET estimation for the HRT tasks. The processor comprises a tool for executing said tasks, that is, the mechanism that allows executing several HRT and NHRT task simultaneously in a MT processor, ensuring that the HRT tasks will end up before their WCET. Said mechanism comprises the means (hardware and/or software) required for executing the following method (see FIG. 2).

Firstly, starting in an idle state, in step (e), the mechanism establishes the setup s of the MT processor, that is, it establishes the set of parameters relating to the configuration of the processor. Next, in a step (f), according to the established setup s, for each shared resource of the shared resources of the processor, the maximum delay that each HRT task can suffer when accessing said shared resource (due to the interaction with the other HRT task and the NHRT task) is determined.

Following, in order to perform the next step of the method, the mechanism, in a step (g), uses a second mechanism that can execute several tasks in a MT processor introducing an artificial delay when certain specified tasks access certain specified resources. That is, said mechanism allows introducing artificial delays to a HRT task when said task accesses a shared resource.

Said second mechanism comprises the required means (hardware/software) for executing the following second method (see FIG. 3).

In a step (a), the second mechanism establishes, for every hardware shared resource and each task to be artificially delayed, the artificial delay (i.e. the maximum delay obtained, for each task and for every shared resource, in step (j)) to be applied to each access of the HRT task to said shared resource. Following, for each task and for every shared resource, the second mechanism verifies, in a step (b1), if a request of the task is ready to be sent to the shared resource to be accessed. In case of positive result, in a step (b2), the second mechanism verifies if the shared resource is ready to accept said request, so that, in case of positive result, the second mechanism, in a step (b3), delays the request of the task by the maximum delay (that is, the artificial delay) established for said shared resource and, in a step (b4), the mechanism allows the request of the task accessing said shared resource.

On the other hand, it is important to highlight that the established maximum delays are stored (in a step (c)) into the processor, and more specifically in a table (DelayTab) that can be implemented with a set of registers, said table having as many entries as the maximum number of tasks that can be delayed. In each entry, it is saved the artificial delay to add to said task. In this case, the artificial delay is the maximum delay a HRT can suffer to get access to the shared resource when run with the other HRT task and the NHRT task, the processor being configured in setup s.

Sequentially, each HRT task is executed in isolation and artificial delays are applied according to every shared resource, the first mechanism follows the execution of the first method. Then, coming back to FIG. 2, in a step (h), the first mechanism computes the WCET for each HRT task according to the result obtained with the execution of the first method, taking into account the setup s. Next, the first mechanism, in a step (i), verifies if the computed WCET for each HRT task fits a given suitable scheduling of the HRT tasks, that is, the first mechanism verifies if it is possible to execute the HRT tasks and the NHRT task simultaneously (the WCET of each HRT task is lower than the deadline of said HRT task). In case of positive result, in a step (j), the first mechanism configures the processor in a mode in which no artificial delay is applied to the tasks when said tasks access shared resources. In case of negative result in step (i), the control of said first method goes to step (e), that is, it is necessary to configure the processor according to another setup. If no suitable processor setup is found the process ends.

Finally, in a step (k), the first mechanism executes the HRT tasks and the NHRT task simultaneously according to the mode configured in step (j).

FIG. 4 illustrates the components of the mechanism for performing the method to artificially delay the access, of threads running in a multithreaded processor, to the hardware shared resources of said multithreaded processor. In a given multithreaded processor 120, for each shared resource 130 the second mechanism comprises one Artificial Delay Control Unit (ADCU) Module 140 that is comprised by the DelayTab Table 142 and a multiplexor 144. A possible implementation of module 142 (DelayTab Table) is by means of a set of hardware registers. Each of the entries of the DelayTab saves the delay to introduce into the execution of each running tasks. ADCU module 140 further comprises a multiplexor 144 that selects from the DelayTab the appropriate entry depending on the number of the thread accessing the shared resource that is saved in register 143. It is assumed, without lost of generality, that the arbiter 135 is able to provide the number of the thread that is ready to access the shared resource. If there is no arbiter, another module inside the shared resource 130 provides the thread number.

The arbiter 135 grants access to the different tasks to that resource. The arbiter may implement different access policies that are configurable from the software. Additional connections may be possible inside the arbiter and other components in the shared resource, not shown in FIG. 4.

The module 110 establishes the DelayTab of the different shared resources (130 in this case). The DelayTab of the different resources is filled sequentially using the channel 121. Once the DelayTab in each resource has been filled, module 115 starts the execution of the tasks. This module is the same than in any standard multithreaded architecture.

During the execution of the tasks on every access to a shared resource, multiplexor 144 is driven with the number of the thread accessing the shared resource. Once the request and the shared resource are ready, the ADCU delays the access to the shared resource the time (that can be expressed in processor cycles) read from the DelayTab table.

According to a preferred embodiment of the invention, said modules 110 (it establishes de DelayTabTable) and 115 (execution module) are implemented in the form of a computer program. The other modules in FIG. 4 are implemented in hardware.

Figure 5:
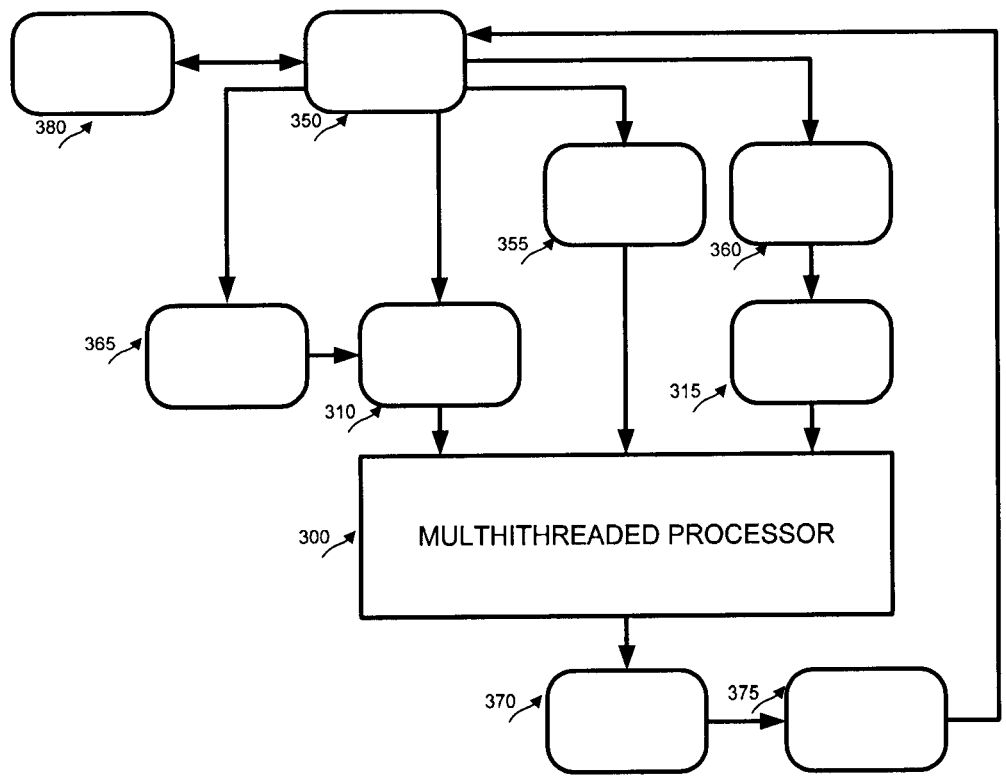
FIG. 5 is a schematic representation of the mechanism for executing several HRT tasks together with zero or more NHRT tasks simultaneously in a multithreaded (MT) processor, so that it is possible to compute a safe WCET estimation for the HRT tasks, according to the invention.

FIG. 5 shows how to integrate the method to artificially delay the access of threads running in a multithreaded processor to the hardware shared resources of said multithreaded processor, with the method that allows computing a safe Worst-Case Execution Time (WCET) of several Hard Real-Time (HRT) tasks under a given processor setup in which they run together with zero or more Soft Real-Time Tasks (SRT) and Non Real-Time (NRT) tasks in a multithreaded processor.

In FIG. 5 the multithreaded processor 300 has the means to implement the method to artificially delay the access of threads running in a multithreaded processor to the hardware shared resources of said multithreaded processor as described in FIG. 4.

Initially module 350 calls module 355 which establishes the processor setup. The processor setup may include, for example, a different arbitration policy among the tasks when accessing a shared resource. Next, call module 350 calls module 365 that is in charge of computing the maximum delay each access of a HRT task can suffer when access each shared resource, $Maxdelay^{ri}_s$, taking into account the current processor setup.

Computing module 365 calls modules 310 (that corresponds to module 110 in FIG. 4) passing the values of $Maxdelay^{ri}_s$. Module 310 uses these values as the artificial delays to add to the accesses of the running threads. Hence, every time the HRT task is ready to access said shared resource, the processor introduces a delay of $Maxdelay^{ri}_s$, before the HRT task can use the shared resource. By doing so, we are delaying the HRT task the maximum time it can be delay when run together with other HRT and NRT tasks.

Next call module 350 calls module 360 that selects one HRT task and pass it to module 315 (that corresponds to Module 115 in FIG. 4) which starts said HRT task. Once the simulation ends module 370 collects data about the execution of said HRT task. Once module 370 finishes it sends the information to module 375 that estimates a WCET for the HRT. This can be done with any of the current methods like static WCET analysis or measurement-based analysis. The resulting WCET, is an upper bound of the execution time of the HRT when run with other tasks under the current processor setup. Next, estimating module 375 sends this information to call module 350, which repeats the same process for all HRT tasks.

Once call module 350 has a WCET estimation for each HRT task, it sends this information about the WCET of each HRT to module 380. Module 380 tries to build a feasible scheduling taking into account the deadline of the HRT tasks and the other NHRT to schedule.

If a feasible scheduling is found, scheduling module 380 calls computing module 365 that sets all delays to zero and pass them to module 310. Module 310 writes these values as artificial delays into the DelayTab of each shared resource of the processor. At this point, the execution of the task set can start so that no artificial delay is added in the access to shared resources, and the estimated WCET is a safe upper bound of the execution time of the HRT tasks when run with other NHRT tasks sharing the resources of the multithreaded processor, under the current processor setup.

If a feasible scheduling is not found, call module 350 looks for another processor setup that leads to a feasible scheduling. If no scheduling is found, the task set cannot be scheduled. In that case, it is required to change the task set.

EXAMPLE

Figure 6:
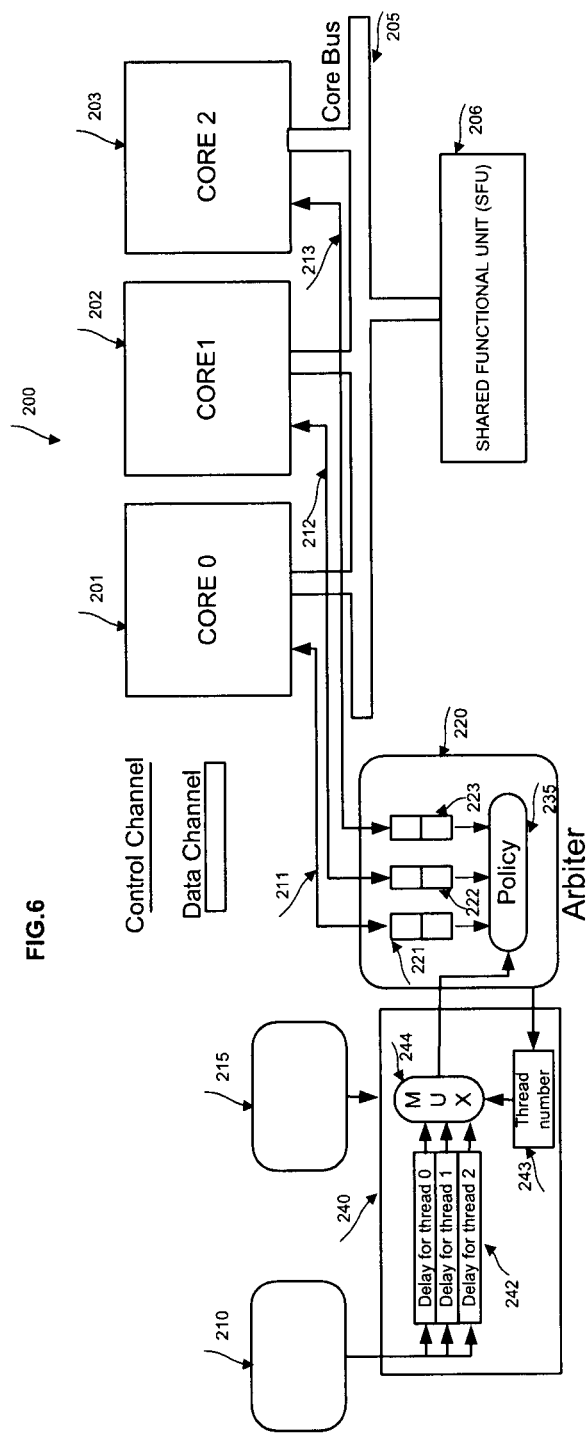
FIG. 6 is a schematic representation of an example of architecture of a MT processor comprising the mechanism of FIG. 5.

FIG. 6 shows a multicore architecture 200 having three computation cores 201, 202 and 203, in which each core can execute one thread. All cores are connected to a shared functional unit (SFU) 206 by a shared bus 205.

The access to the shared bus and to the Shared Functional Unit bus is controlled by an arbiter 220. Each core connects to the arbiter by a private control channel (buses) 211, 212 or 213. In said architecture, it is executed two HRT tasks, HRT1 and HRT2, and one NHRT task.

Without lost of generality and for the purpose of this example, it is assumed that only one operation from any of the cores can be processed by the bus and the SFU at a time. It is further assumed that the latency of the bus is 2 cycles and the latency of the SFU is 5 cycles. Hence, the SFU can accept a new operation every 5 cycles and the bus one every two at most.

In its normal behaviour, when a task runs in a core and wants to access the SFU, it generates a request to the arbiter 220. This request is send to the arbiter by one of the control buses 211, 212 or 213. Inside the arbiter, each core has a private request queue 221, 222 or 223, where all the requests from that core are saved till they are processed. In this example it is assumed two entries per request queue.

In the arbiter 220, a selection policy 235 determines which request from all the requests in the request queues gets access to the bus and the SFU. The arbiter takes into account the latency of the bus and the SFU in order to prevent that both request try to access to the shared bus or SFU at the same time.

When a task suffers no resource conflict with other tasks, either in the bus or the SFU, its request to the SFU follows the timing shown in FIG. 7. In a given cycle n−1, the request is sent to the arbiter, so it is ready to be processed in the next cycle, n. In cycle n, the arbiter decides which request gets access to the bus and SFU. Given that there is only one request, it is granted access (A). In cycles n+1 and n+2 the request uses the bus to access the SFU (B). From cycles n+3 to n+7 the operation is processed in the SFU (S).

Once the operation is ready, its result is sent back to the core generates it. In this case it is assumed that for this purpose there is another bus and arbiter, in which the same process is repeated.

When several requests of different cores want to access the SFU simultaneously, the arbiter prioritizes a request, which introduces delays in the other requests. This delay depends on the number of tasks and on the selection policy in the arbiter. In this example it is assumed that the arbiter prioritizes the request from the HRT tasks over the request of the NHRT task. Further it is assumed that HRT tasks' requests are processed in round robin fashion.

According to the invention, it is necessary to determine the maximum delay a HRT task can suffer to get access to a shared resource, due to the interaction with the requests from the other HRT task and NHRT task. In this example, MaxDelay$^{ri}_s$ depends on the number of HRT tasks, the arbiter selection policy and the delay of the bus and the SFU. For example, let's assume that HRT1 wants to access the SFU in a given cycle n−1, meaning that the arbiter receives the request in this cycle and in cycle n could arbitrate and grant access to that thread that would access the bus in cycle n+1. The worst situation that may arise is that in cycle n−1 a request from the NHRT time is granted access to the bus and the SFU, and the HRT2 task has a request in the queue that has higher priority, according to the round robin policy, than the request from the HRT1. In this situation, the timing followed by the request from the HRT1 is shown in FIG. 8: The request of the NRT task is processed in cycle n+6. In cycle n+4, the arbiter grants access to the request from the HRT2, so that it accesses the bus in cycles n+5 and n+6, and in cycle n+7 this requests starts being processed. Hence the request from the HRT1 is delayed up to 9 cycles due to the interaction with the requests of HRT2 and NHRT. Hence, under the processor setup, say $s_0$, in which (1) there are 2 HRT tasks and one NHRT task; and (2) the arbiter selection policy prioritizes request of HRT tasks over NHRT tasks and uses a round robin policy among HRT tasks, the worst delay a HRT task can suffer due to the interaction with the other HRT and NHRT tasks, MaxDelay$_{s0}^{bus+SFU}$, is 9 cycles.

In this particular example it is assumed a single processor setup, $s_0$, and a shared bus and SFU unit. Once the computation of the MaxDelay$^{ri}_s$ for the bus and the SFU in this case is done, it is saved in the DelayTab table of ADCU associated to the SFU and shared bus.

The next step, according to the invention is to compute the WCET. This can be done with any existing method, say static WCET computation, measurement-based WCET computation, etc. Each HRT is executed in isolation. In this situation, every time a request from the HRT task is ready to be sent to the bus and SFU the ADCU delays it by MaxDelay$^{ri}_s$ that in our example equals 9.

The information of the execution of each task is passed to an external module (380 in FIG. 4.), that takes it into account when computing an estimation the WCET of each HRT task. By adding this worst-case delay, MaxDelay$^{ri}_s$, in the WCET computation, it is taken into account the maximum delay a HRT task can suffer due to the interaction with other tasks.

After the WCET$^{ri}_s$ is computed for both HRT tasks, the DelayTab is reset (i.e. all entries are set to zero). Then a scheduling algorithm selects a feasible algorithm for the tasks to run in the multithreaded processor. It is assumed that in this example only HRT1, HRT2 and NHRT have to be run. The scheduling algorithm needs to find a processor setup so that for each HRT task WCET$_s$<deadline. In the present example, it is assumed that under the single processor setup this is true for HRT1 and HRT2 (NHRT has no time constraints).

The final step is to run the multithreaded workload composed by the HRT tasks and the NRT task at the same time. The WCET$^{ri}_s$ computed for each HRT task is a safe upper-bound of the time it is going to take them to finish their execution.

This scheme can be extrapolated to any multithreaded architecture in which there are more shared resources. Hence, the first mechanism according to the invention enables the execution of one HRT task on a multithreaded processor with several other NHRT tasks.

From Local Delay To Global Delay

The invention also relates to a multithreaded processor in which when several HRT and zero or more NHRT tasks are executed simultaneously in a multithreaded processor. If any of the HRT task wants to use a shared resource that is being used by another task, it is delayed. In our proposed architecture, there is an upper bound of the maximum time the HRT task has to wait for the NHRT, MaxDelay. The HRT task perceives this inter-task resource interaction as an 'extra' delay in the execution of the instruction accessing this resource. This delay will be referred as local delay or Ld. The local delay follows the following rule: 0≤local delay≤MaxDelay.

In [Thomas Lundqvist and Per Stenström. *Timing Anomalies in Dynamically Scheduled Microprocessors* Thomas. *Proceedings of the 20th IEEE Real-Time Systems Symposium (RTSS)*. pp 12-21. December 1999] and [Jan Reineke, Björn Wachter, Stephan Thesing, Reinhard Wilhelm, Ilia Polian, Jochen Eisinger, Bernd Becker. *A Definition and Classification of Timing Anomalies. 7th International Workshop on Worst-Case Execution Time (WCET) Analysis.* July 2006], it is shown that depending on the underlying processor architecture and execution model (in-order execution, out-of-order execution, super-scalar execution, etc), a given local delay on an instruction of a program may result in a Global delay in the execution of the program, Gd where Gd>Ld. Even worse, the local delay may result on an unbound global delay. Some of these, so called, time anomalies, occur in processors that execute the instructions out of order, other in processors with caches, and other with processors supporting speculation.

In the frame of this invention, we have not made any assumption about the execution model or processor architecture. In fact, the invention presented here can be applied to any multithreaded architecture in which a local delay in the type of instruction accessing the shared resources results in a bound global delay or where the solutions of proposed in [Thomas Lundqvist and Per Stenström. *Timing Anomalies in Dynamically Scheduled Microprocessors* Thomas. *Proceedings of the 20th IEEE Real-Time Systems Symposium (RTSS).* pp 12-21. December 1999] and [Alexandru Andrei, Petru Eles, Zebo Peng and Jakob Rosen. *Predictable Implementation of Real-Time Applications on Multiprocessor Systems-on-Chip. Proceedings of the 21st International Conference on VLSI Design.* pp 103-110. 2008] to bind the global delay can be applied.

In the discussion in previous sections it is assumed, without lost of generality that the global delay equals the local delay, Gd<=Ld.

Although the present invention has been described in detail for purpose of illustration, it is understood that such detail is solely for that purpose, and variations can be made therein by those skilled in the art without departing from the scope of the invention.

Thus, while the preferred embodiments of the methods and of the systems have been described in reference to the environment in which they were developed, they are merely illustrative of the principles of the invention. Other embodiments and configurations may be devised without departing from the scope of the appended claims.

Further, although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means.

When the program is embodied in a signal that may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A method for executing several tasks in a multithreaded (MT) processor, each task having, for every hardware shared resource from a predetermined set of hardware shared resources in the MT processor, one associated artificial time delay that is introduced when said task accesses said hardware shared resource, the method comprising the steps of:
   a. Establishing, for every hardware shared resource and each task to be artificially delayed, the artificial time delay to be applied to each access of said task to said hardware shared resource;
   b. Performing the following steps (b1) to (b4) upon the access of each task to be artificially time delayed to every hardware shared resource in the predetermined set of hardware shared resources in the MT processor:
      b1. Verifying if a request is ready to be sent to said hardware shared resource; and
   In case of a positive result,
      b2. Verifying if the hardware shared resource is ready to accept said request; and
   In case of a positive result,
      b3. Delaying said request by the artificial time delay established for said hardware shared resource; and
      b4. Allowing the request of the task to access said hardware shared resource.

2. A method according to claim 1, further comprising the steps of:
   c. Storing the established artificial time delay in step (a);
   d. Obtaining a stored artificial time delay.

3. A computer program product comprising a non-transitory storage including program instructions for causing a computer to perform the method for executing several tasks in a MT processor according to claim 1.

4. A method for executing several hard real-time (HRT) tasks simultaneously in a multithreaded (MT) processor, the method comprising the steps of:
   e. Establishing a set of parameters relating to the configuration of the MT processor;
   f. Determining, according to the established set of parameters, the maximum delay, for every resource of a predetermined set of resources shared by at least two of the HRT tasks in the MT processor, that each of said HRT tasks can suffer when accessing said shared resource;
   g. Executing each HRT task in isolation according to the method for executing several tasks in a MT processor according to claim 1, wherein the established artificial time delay for the task is the maximum delay determined in step (f) and each HRT task is delayed when accessing every shared resource according to said artificial time delay;
   h. Computing the Worst Case Execution Time (WCET) for each HRT task according to the execution of said HRT task in step (g), which takes into account the MT processor configuration set of parameters;
   i. Verifying if the computed WCET for each HRT task fits a given suitable scheduling of the HRT tasks;
   In case of a positive result,
   j. Configuring the MT processor in a mode in which no artificial time delay is introduced to the HRT tasks when said tasks access shared resources; and,
   k. Executing the HRT tasks according to said mode.

5. A method for executing several hard real-time (HRT) tasks simultaneously in an MT processor according to claim 4, and simultaneously executing at least one NHRT task, wherein, in step (f), the predetermined set of resources are shared by at least two tasks from any of the HRT tasks and the NHRT task, wherein, in step (j), none of the HRT tasks or the NHRT task is artificially time delayed when accessing a shared resource, and wherein, in step (k), the HRT tasks and the NHRT task are executed.

6. A method according to claim 4, wherein the MT processor configuration set of parameters comprises at least one of the following parameters: the number of HRT tasks to be executed, the number of NHRT tasks to be executed, and the arbitration policy that grants access to each shared resource.

7. A method according to claim 4, wherein, in case of a negative result in step (i), the control of the method goes to step (e).

8. A method according to claim 4, wherein, in step (i), the computed WCET for each HRT task fits the given suitable scheduling of the HRT tasks when the WCET of each HRT task is lower than the deadline of said HRT task.

9. A computer program product comprising program instructions for causing a computer to perform the method for executing several tasks in a MT processor according to claim 4.

10. A multithreaded (MT) processor comprising an at least partially hardware based mechanism for executing several tasks, each task having, for every hardware shared resource from a predetermined set of hardware shared resources in the MT processor, one associated artificial time delay that is introduced when said task accesses said hardware shared resource,
   wherein the at least partially hardware based mechanism includes
   means for establishing, for every hardware shared resource in the predetermined set of hardware shared resources and each task to be artificially time delayed, the artificial time delay to be applied to each access of said task to said hardware shared resource;
   means for verifying if a request is ready to be sent to said shared resource;
   hardware based computing means for verifying if the shared resource is ready to accept said request;
   means for delaying said request by the artificial delay established for said shared resource; and
   hardware based computing means for allowing the request of the task to access said shared resource.

11. A mechanism for executing several HRT tasks simultaneously in a multithreaded (MT) processor, the mechanism comprising
   means for establishing a set of parameters relating to the configuration of the MT processor;
   means for determining, according to the established set of parameters, the maximum delay, for every resource of a predetermined set of resources shared by at least two of the HRT tasks in the MT processor, that each of said HRT tasks can suffer when accessing said shared resource;
   the mechanism for executing several tasks in a MT processor executing each HRT task in isolation, wherein the established artificial delay for the task is the maximum delay and each HRT task is delayed when accessing every shared resource according to said artificial delay;
   means for computing the Worst Case Execution Time (WCET) for each HRT task, which takes into account the MT processor configuration set of parameters;
   means for verifying if the computed WCET for each HRT task fits a given suitable scheduling of the HRT tasks;
   means for configuring the MT processor in a mode in which no artificial delay is introduced to the HRT tasks when said tasks access shared resources; and,
   means for executing the HRT tasks according to said mode.

12. A mechanism for executing several hard real-time (HRT) tasks simultaneously in a MT processor according to claim 11, and simultaneously executing at least one NHRT task, wherein, the predetermined set of resources are shared by at least two tasks from any of the HRT tasks and the NHRT task, wherein, none of the HRT tasks or the NHRT task is artificially delayed when accessing a shared resource, and wherein means for executing the HRT tasks executes the HRT tasks and the NHRT task.

13. A multithreaded (MT) processor comprising a mechanism for executing several tasks according to claim 11.

14. A multithreaded (MT) processor comprising a processor architecture including hardware structures and software, the architecture configured for the MT processor to execute several tasks, each task having, for every hardware shared resource from a predetermined set of hardware shared resources in the MT processor, one associated artificial time delay that is introduced when said task accesses said hardware shared resource,
   the processor architecture including:
   one or both of an at least partially hardware based structure and software configured to establish, for every hardware shared resource in the predetermined set of hardware shared resources and each task to be artificially time delayed, the artificial time delay to be applied to each access of said task to said hardware shared resource;
   one or both of an at least partially hardware based structure and software configured to verify if a request is ready to be sent to said shared resource;
   one or both of an at least partially hardware based structure and software configured to verify if the shared resource is ready to accept said request;
   one or both of an at least partially hardware based structure and software configured to delay said request by the artificial delay established for said shared resource; and
   one or both of an at least partially hardware based structure and software configured to allow the request of the task to access said shared resource.

* * * * *